United States Patent
Ramström et al.

(10) Patent No.: US 6,477,445 B1
(45) Date of Patent: Nov. 5, 2002

(54) METHOD AND APPARATUS FOR CONTROLLING AN INDUSTRIAL ROBOT

(75) Inventors: Karl-Gustav Ramström; Torgny Brogårdh, both of Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/937,400

(22) PCT Filed: Apr. 3, 2000

(86) PCT No.: PCT/SE00/00640

§ 371 (c)(1),
(2), (4) Date: Sep. 26, 2001

(87) PCT Pub. No.: WO00/60427

PCT Pub. Date: Oct. 12, 2000

(30) Foreign Application Priority Data

Apr. 1, 1999 (SE) .............................. 99012155

(51) Int. Cl.$^7$ .............................. G06F 19/00
(52) U.S. Cl. ............... 700/245; 700/247; 700/249; 318/561; 318/568.17; 318/568.18; 318/621; 318/627; 318/631; 701/23
(58) Field of Search ............... 700/245, 247, 700/249; 318/561, 580, 584, 568.17, 568.18, 590, 611, 621, 626, 627, 631, 615, 266, 632; 701/23

(56) References Cited

U.S. PATENT DOCUMENTS

| | | | | |
|---|---|---|---|---|
| 4,374,349 A | * | 2/1983 | Inaba et al. | 318/568.17 |
| 4,463,297 A | * | 7/1984 | Bennett et al. | 318/561 |
| 4,488,098 A | * | 12/1984 | Shimonou | 318/561 |
| 4,500,823 A | * | 2/1985 | Walrath | 318/632 |
| 4,507,594 A | * | 3/1985 | Takemoto | 318/615 |
| 4,540,923 A | * | 9/1985 | Kade et al. | 318/561 |
| 4,612,489 A | * | 9/1986 | Gunda | 318/590 |
| 4,727,303 A |  | 2/1988 | Morse et al. |  |

FOREIGN PATENT DOCUMENTS

| | | |
|---|---|---|
| EP | 0159131 | 10/1985 |
| EP | 0498891 | 8/1992 |
| EP | 0850730 | 7/1998 |
| EP | 0851985 | 9/2001 |
| SE | 504601 | 3/1997 |
| WO | WO 9203769 | 3/1992 |
| WO | WO 9711297 | 3/1997 |
| WO | WO 9853376 | 4/2001 |

OTHER PUBLICATIONS

Romiti et al., Four track mobile robot for non stuctured environments, 1991, IEEE, pp. 926–930.*

* cited by examiner

Primary Examiner—William A. Cuchlinski, Jr.
Assistant Examiner—McDieunel Marc
(74) Attorney, Agent, or Firm—Dykema Gossett, PLLC

(57) ABSTRACT

An equipment for controlling an industrial robot, which robot has a plurality of rotation and/or translation axles (ax 1–6), comprising a motor (15) at each of said axles for generating desired movements of the arms and/or the wrist, of which the robot is constituted, a sensor at each of the axles for measuring axle angle and/or axle position, a servo (9) for each of the axles for controlling the motors based on measurement values from the sensors, and a path generator (8) for generating at least one reference ($\phi_{ref}$, $\dot{\phi}_{ref}$, $\tau_{ffw}$) for each of the servos (9). The equipment comprises an apparatus (1+2+3+4+5+6+7+parts of 8+18A+18B) at least one of the axles, which apparatus comprises a first device (18A) for calculation of the expected interference moment value ($\tau_{distexp}$) of said axle when the movable parts of the robot is not exposed to any external forces by interaction with the operator (64) or other things in the surroundings of the robot, and a second device (18B) for comparing this expected interference moment value ($\tau_{distexp}$) with values of the moment reference ($\tau_{mr}$) of the servo (9) and/or with values of the moment ($\tau_m$) of the motor and/or with values of the moment of the axle (14) and for forming, based on this comparison, a signal ($\tau_{control}$) for controlling the path generator (8). A method for programming/adjusting the movement of a robot is also included.

22 Claims, 8 Drawing Sheets

METHOD AND APPARATUS FOR CONTROLLING AN INDUSTRIAL ROBOT

FIELD OF THE INVENTION

This invention relates to an equipment for controlling an industrial robot. Furthermore, the invention relates to a method for programming and/or adjusting the movement of a robot.

PRIOR ART

An industrial robot comprises several arms, which are moveable in relation to each other, and a holder designed for mounting of the tool, object or gripping appliance, which the robot is to handle. The industrial robot is provided with a control system, which controls position and orientation of the tool/object/gripping appliance, and for each of the movement axles of the robot there is a servo system with a driving motor. The servo system of each axle is supplied with a reference value (desired valued) for the rotation angle of the axle and the driving motor of the axle makes the manipulator move in the axle in question until the axle position corresponds with the reference value supplied to the servo system. With an axle is here meant axle transmissions, which can cause rotation as well as translation of the moveable arms of the robot.

The industrial robots of today are programmed either off-line or on-line by so called teach-in. During programming in teach-in the reference values to the servo systems of the axles are generated from a so called interpolator, which interpolates a path for the tool of the robot based on the signals from press-buttons or a control stick located on a particular programming unit. This teach-in technique has the following drawbacks:

- it is difficult to know which movement the object carried by the robot obtains at a given button pressing/control stick movement;
- it is difficult to control the object movements when the object by touching its surroundings is exposed to forces from different directions. In this direction, there is a very great risk that the control system disengages due to obtainal of too large motor moments;
- it is difficult to manipulate objects which are partly concealed by surrounding equipment;
- it is difficult to obtain smooth movement patterns, since it is difficult to control 6 degrees of freedom simultaneously by means of a control stick. Therefor, the position of the object is normally programmed separately from the programming of the orientation of the object, which makes it difficult to obtain for instance an effective distribution of the reorientation between programmed positions, at the same time as the switching technique is time-consuming.

OBJECT OF THE INVENTION

The present invention aims at providing a technique which solves the above mentioned problems in teach-in and which at the same time makes the programming much more simple and faster, in particular in applications such as assemblage, disassembly and advanced material handling.

SUMMARY OF THE INVENTION

The invention is based on a servo with a high sensitivity to external forces on robot-arms, tool, object and gripping appliance. These forces causes, in the servo systems of the axles, regulation of the motor moments, and by means of a particular functionality in each axle servo a moment control of the reference values to the servo is obtained. This implies that if for instance the operator takes in his hand the object carried by the robot and moves and rotates it, the robot will follow the movements of the object and at the same time support it even though it is very heavy. For the operator, the object will in this way become weightless during the programming.

With this technique, the object will fully follow the intentions of the operator without the operator having to keep a check on relations between for instance control stick directions and the movement direction/rotation axle of the object. When the object is to touch its surroundings, which is always the case during assemblage, the robot can never obtain to high motor moments, since the moment will decrease instead of increase during interaction between object/robot and the surroundings. Furthermore, the operator does not have to see the whole object, on the contrary, by means of interaction between the object and the surroundings, he can get assistance in finding the correct way for the movement of the object.

It should also be pointed out that the programming method can be used during execution of robot programs, whereby the operator can assist the robot in order to adjust its movement.

An apparatus for controlling the reference values to the axle servo of a robot is consequently integrated with the servo system. The method according to the invention utilises this apparatus for an effective robot programming.

The apparatus is constructed so as to give the robot axles alternating to and fro movements with a small amplitude, and in the apparatus the mean value of the motor moment required in this connection is compared with an expected mean value calculated by the apparatus. The difference or the quotient between these mean values forms a control moment, which either gives a position or speed control of the position reference to the axle servo. The expected mean value of the motor moment is calculated by means of a rigid body model for robot/load and/or by extrapolation of calibrated values.

The idea of the method for the robot programming is to move around by means of the hands the robot arms/object carried by the robot and at suitable position/orientations of the object press a button or the similar so as to cause a calibration of the expected mean value. For accurate positioning there is a further button or similar which makes the control system passing on from speed control to position control of the reference values to the axle servos. If the load (the object carried by the robot) is not known, it is possible to press a button or the similar so as to cause the identification of the load parameters. For a complete identification it is required that the operator turns the load between two orientations and in each orientation presses the identification button. This methodology, besides making the manipulation of the objects easier, also makes the programming itself easier than in the robot systems of today. Furthermore, the method of moving around robot arms/object can be used in order to, during program execution, assist the robot in for instance positioning the object correctly when the conditions in the surroundings of the robots are changed.

BRIEF DESCRIPTION OF THE DRAWINGS

With reference to the appended drawings, a more detailed description of an embodiment of the invention, given as an example, will follow hereinbelow.

In the drawings

DETAILED DESCRIPTION OF PREFERRED EMBODIMENT

Figure 1A:
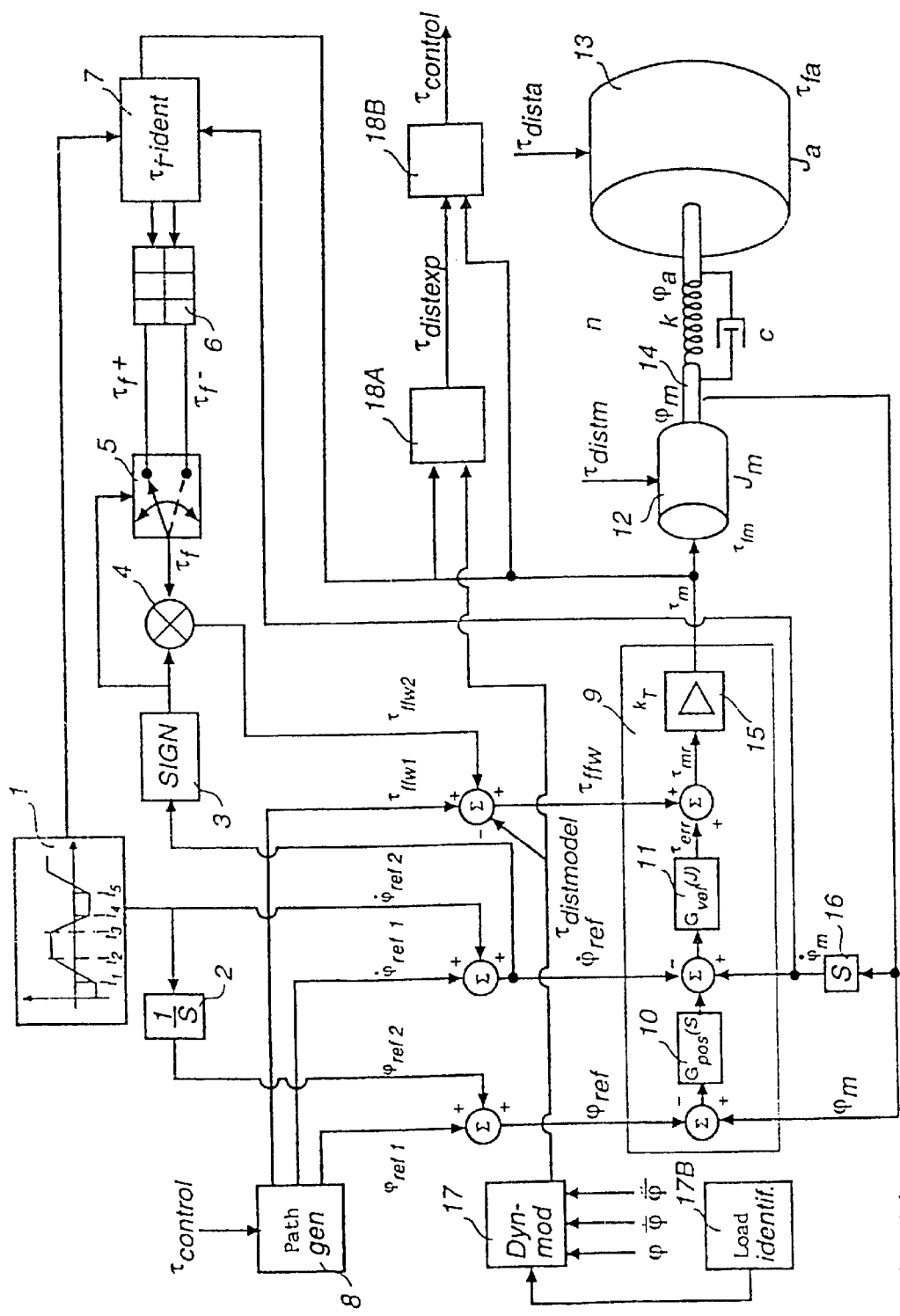
FIG. 1a is a schematic view illustrating a part of the inventional equipment.
Figure 1B:
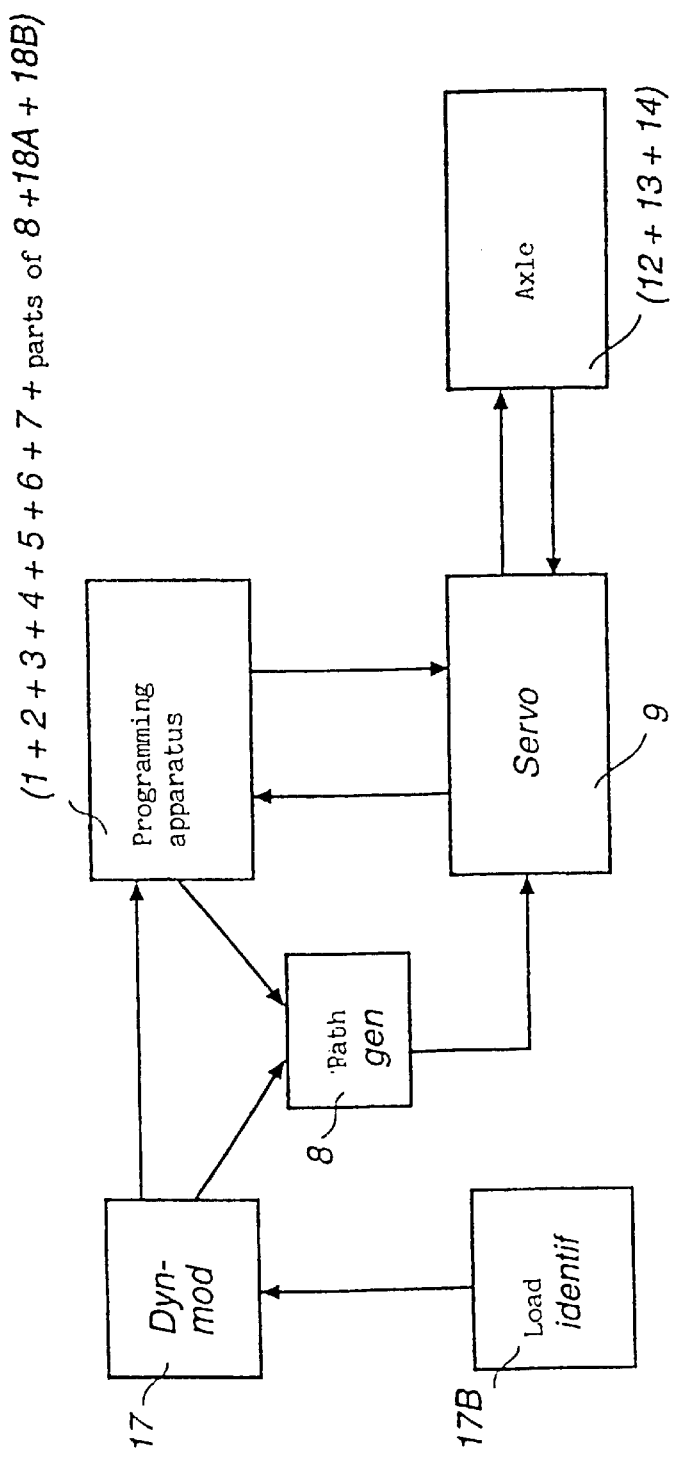
FIG. 1b is a block diagram illustrating the main parts of the equipment.

FIG. 1 shows for each of the axles of the robot a simple axle model 12, 13, 14, a cascade connected servo 9 and the circuits or reference generation to the servo during the programming phase 1, 8. The path generator 8 calculates position and speed references ($\phi_{ref1}, \dot\phi_{ref1}$) and moment feed forward control signal ($\tau_{ffw1}$) to the servo 9. The apparatus, integrated in the servo, for teach-in-programming and robot manipulation consists of the blocks 1, 2, 3, 4, 5, 6, 7 and 18 (A+B). In order to obtain a high sensitivity to external interference moments during the programming, a movement pattern from the function generator 1 is added to the servo references, which movement pattern is of such a nature that the arm will make small short movements to and fro during the programming. These movements make that static friction in motor, gearing and arm bearing is continuously overcome by the motor moment, which in its turn makes that external forces do not have to overcome the friction. The function generator 1 can generate different periodic curve shapes, and in FIG. 1 a cut saw-tooth shape is shown as speed reference signal $\dot\phi_{ref2}$. So as not to build up interfering control errors in the servo 9, a corresponding position reference $\phi_{ref2}$ is applied, which position reference is obtained by integration of $\dot\phi_{ref2}$ with the integrator 2. So as to make the arm follow the speed profile of the signal generator 1 even better, a moment feed forward control $\tau_{ffw2}$ can also be added. The purpose of this moment feed forward control signal is to assist in overcoming the frictional moment for the axle, which implies that the servo 9 does not have to build up so large servo errors in order to generate the frictional moment of $\tau_m$, which in its turn implies that the frequency of the periodic reference from the function generator 1 can be chosen higher. The moment feed forward control signal $\tau_{ffw2}$ is obtained by multiplication, in the circuit 4, of the friction value $\tau_f$ by the sign of the speed reference $\dot\phi_{ref}$. Alternatively, it is possible to use the sign of the real speed $\dot\phi_m$. Possibly, the module 3 also has to include a delay so as to match the change of $\tau_{ffw}$ to the laps of time of the real friction. The friction value $\tau_f$ can be direction dependent and therefor the value of $\tau_f$ is switched in the module 5 between two different values depending on the direction, i.e. depending on the sign of $\dot\phi_{ref}$ or $\dot\phi_m$. The estimated frictional moment in positive direction is denominated $\tau_f^+$ and in negative direction $\tau_2^-$. These values can either be identified at a calibration point of time or identified continuously. In the figure, the latter case is shown, where the identification is carried out in the module 7 and the identified values are supplied to the storage buffer 6. The most simple method for the friction identification is simply to make the following approximation:

$$\begin{cases} \tau_f^+ = \tau_f^- = \tau_f^* & (1) \\ \tau_f^* = \dfrac{\tau_m^+ - \tau_m^-}{2} & (2) \end{cases}$$

The measuring of $\tau_m^+$ and $\tau_m^-$, respectively, is suitably controlled by the function generator 1, but can also be controlled by the sign of $\dot\phi_m$.

In the figure, the servo 9 is implemented as a speed servo with the regulator filter 11 cascade connected with a position servo having the regulator filter 10. Other regulator structures can of course be used, and besides only measuring the axle position $\phi_m$ the axle speed $\dot\phi_m$ can also be measured. Furthermore, it would be possible to measure moment, arm position $\phi_a$, arm speed $\dot\phi_a$ and/or arm acceleration $\ddot\phi_a$. In FIG. 1, it is assumed that only the motor position $\phi_m$ is measured and that motor speed is estimated by the module 16 by differentiation.

Moreover, 15 is the drive to the motor (with the moment contant $k_T$), 12 is the rotor of the motor with mass inertia Jm, the interference moment $\tau_{distm}$ and the friction $\tau_{fm}$. 13 corresponds to the mass of the arm with the mass inertia Ja, the interference moment $\tau_{dista}$ and the friction $\tau_{fa}$. Between the rotor 12 and the arm 13 there is a weakness (k) and a damping (c).

The to and fro movement generated by the function generator 1 has to be so large that the motor as well as the arm will be set in motion. Consequently, the feed forward control moment $\tau_{ffw2}$ should be given by:

$$\tau_{ffw2} = \tau_{fm} + \frac{1}{n} \times \tau_{fa} \qquad (3)$$

where n is the gear change of the gearing between the motor and the arm. In $\tau_{fm}$ the friction of the high speed side of the gearing should also be included and in $\tau_{fa}$ the friction of the low speed side of the gearing.

In order to be able to detect and estimate the interference moments $\tau_{dista}$ on the arm side depending on the force from the operator during manipulation of the robot, the expected interference moment $\tau_{distmodel}$ applicable without operator force is calculated in the dynamical model 17. At low speeds, it is normally sufficient that $\tau_{distmodel}$ only includes statical components such as the gravitational moment of $\tau_{dista}$ and the stator and motor rippel moments of $\tau_{distm}$. At higher speeds, the interference component from the centrifugal and coriolis force, viscous friction and coupled mass inertia should also be included in $\tau_{distmodel}$.

Figure 2:
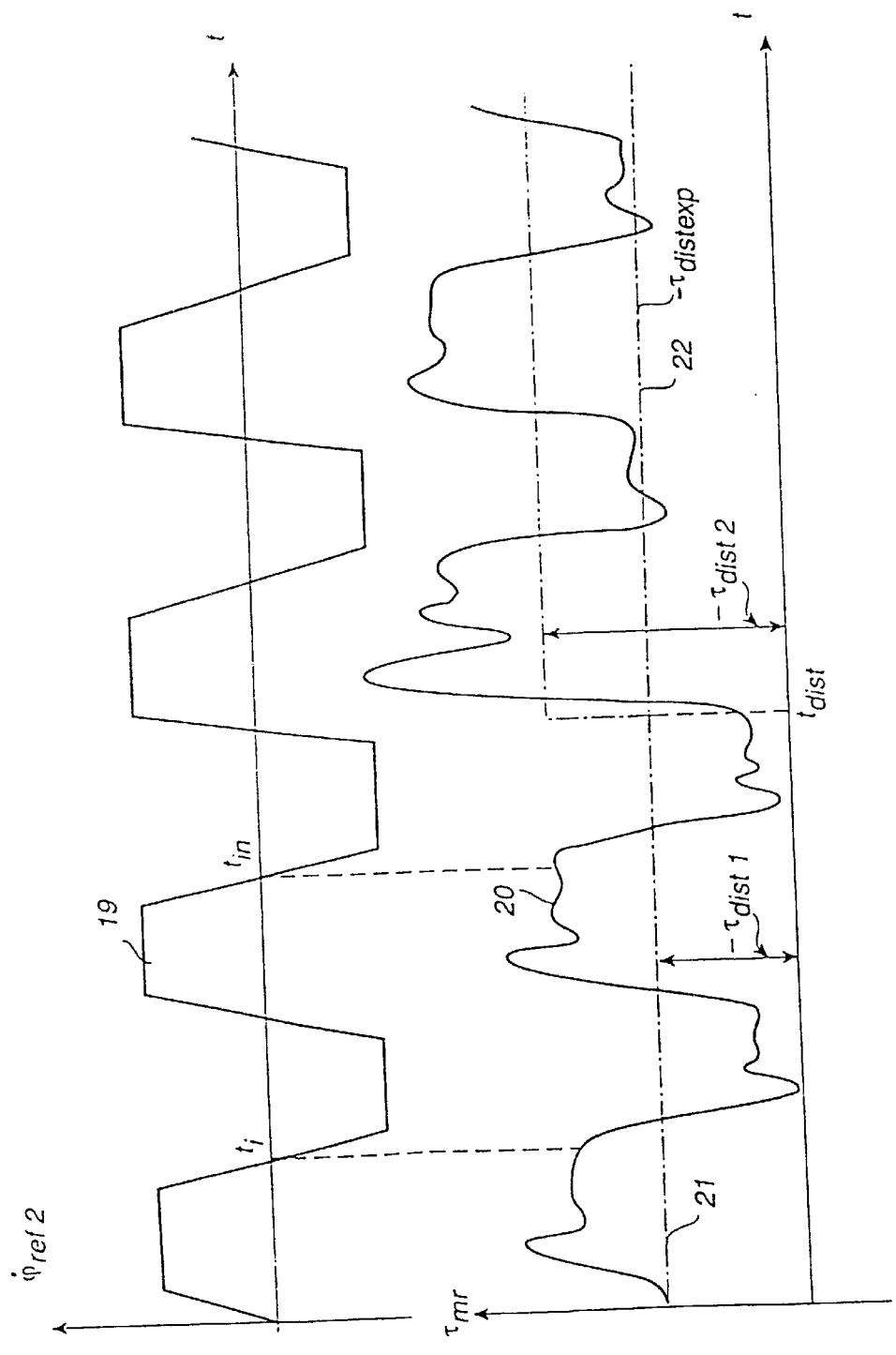
FIG. 2 is a diagram showing the signal from a function generator, as well as the resulting moment reference signal.

FIG. 2 shows the signal ($\phi_{ref2}$ (19)) from the function generator 1 as well as the resulting moment reference signal $\tau_{mr}$ (20). At the point of time $t_{dist}$ the interference moment ($\tau_{distm} + \tau_{dista}$) is changed with the value $\tau_{dist2} - \tau_{dist1}$, see signal 21 at the point of time $t_{dist}$. The regulator 9 will compensate for this change in interference moment and the mean moment level of the signal $\tau_{tmr}$ will be changed with the value $\tau_{dist2} - \tau_{dist1}$. When the interference moment level is now to be used for interpolation of the movement of the robot as a function of the external force, with which the programmer of the robot presses on the robot, the following calculation is made in the module 18B (in FIG. 1):

$$\tau_{control} = 1 - \frac{\tau_{mrav}}{\tau_{dist\,exp}} \times \left( alt \cdot \frac{\tau_{dist\,exp}}{\tau_{mrav}} - 1 \right) \quad (4B)$$

where $\tau_{control}$ is the moment used by the path generator 8, $\tau_{mrav}$ the mean value of $\tau_{mr}$, and $\tau_{distexp}$ (22) the expected interference moment without interference moment generated by the operator. $\tau_{distexp}$ is generated by the module 18A in the apparatus for robot programming.

$\tau_{mrav}$ is calculated according to:

$$\tau_{mrav} = \frac{1}{(t_{i+1} - t_i)} \times \int_{t_i}^{t_{i+1}} \tau_{mr}(t) dt \quad (4C)$$

since $\tau_{mr}$, in the robot systems of today, is sampled, the integral is normally calculated as a mean value of discrete moment values.

The problem is now to calculate $\tau_{distexp}$ when the robot gradually changes its configuration (its axle angles) during the programming. Here there are now two methods. The first method implies that $\tau_{distexp}$ is calculated from the rigid body dynamical model 17 of the robot, which requires that, besides a description of the masses, positions of centre of gravity, kinematical relations and possibly main mass-moment of inertia of the robot, the corresponding parameters for the load (tool, object carried by the robot, gripping appliance) also have to be available. Since programming often takes place at low speeds and accelerations, the gravitational moment will completely dominate $\tau_{distexp}$ and it is only necessary to know the mass ($m_L$) and the position of centre of gravity ($X_L, Y_L, Z_L$) of the load in relation to the attachment plate of the robot.

The idea of the second method, which preferably is combined with the first method, is that the robot programmer at regular intervals releases the robot and thereupon calibrates $\tau_{distexp}$ so that the value thereof is updated in the module 18A according to:

$$\tau_{distexp} = -\tau_{mrav} \quad (5)$$

In case of a combination of these two methods, the module 18A uses the interference moment $\tau_{distmodel}$ calculated by the model 17 according to:

$$\tau_{distexp} = \tau_{disterr}$$

$$+\tau_{distmodel} \quad (6)$$

When the operator now releases the robot, a calibration of the model error $\tau_{disterr}$ takes place according to:

$$\tau_{mrav} = -\tau_{disterr}$$

$$-\tau_{dist\,mod\,el} \quad (7)$$

$$\tau_{disterr} = -\tau_{mrav}$$

$$-\tau_{dist\,mod\,el} \quad (8)$$

The model error can also be calculated in the module 18A as a correction factor:

$$\tau_{dist\,exp} = K_{err} \times \tau_{dist\,mod\,el} \quad (9)$$

and during calibration:

$$K_{err} = \frac{\tau_{mrav}}{\tau_{distmodel}} \quad (10)$$

Figure 3:
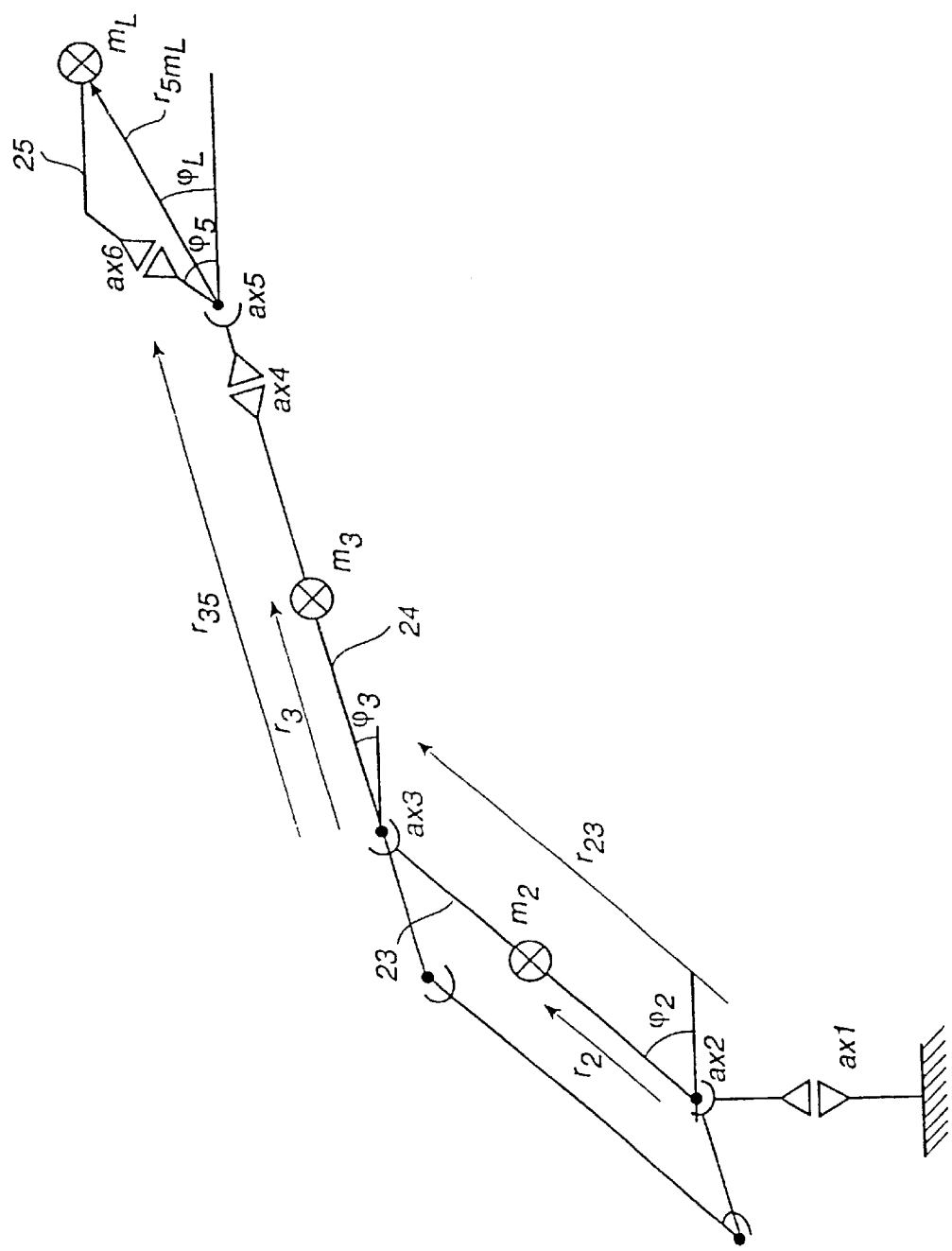
FIG. 3 is a schematic model of a 6-axle robot projected onto a plane.

During the time when the operator is not touching the robot or the robot load, and identification of the load parameters ($m_L, x_L, y_L, z_L$) can be carried out. How this is done is shown with the aid of FIG. 3. FIG. 3 shows a simple dynamical model of a 6-axle robot projected onto a plane, which makes it easier to show the identification technique. Masses and centres of gravity ($m_i, r_i$) for the robot itself with the underarm 23 and the overarm 24 are known with high accuracy, and the mass ML and the position of centre of gravity ($r_{5mL}, \phi_L$) of the load is to be identified. From FIG. 3, with axle angles ($\phi_2, \phi_3$ and $\phi_5$ defined in relation to the horizontal plane, as well as the angle $\phi_L$ are obtained:

$$\begin{cases} -\tau_{mav2} = r_2 \times m_2 \times \cos\varphi_2 + r_{23} \times (m_3 + m_L) \times \cos\varphi_2 & (11) \\ -\tau_{mav3} = r_2 \times m_3 \times \cos\varphi_3 + (r_{35} \times \cos\varphi_3 + r_{5mL} \times \cos\varphi_L) \times m_L & (12) \\ -\tau_{mav5} = r_{5mL} \times \cos\varphi_L \times m_L & (13) \end{cases}$$

where $\tau_{mavi}$ is the mean moment of the periodic moment signal 20 in FIG. 2 when the operator is not touching the robot.

For a complete identification it is required that the operator turns the load to a new position, which gives:

$$|\tau'_{mav5}| = \Gamma_{5mL} \times \cos(\phi_L + \Delta\phi_5) \times m_L \quad (14)$$

from (12), (13) and (14) are obtained:

$$m_L = \frac{-\tau_{mav3} + \tau_{mav5} - r_3 m_3 \times \cos\varphi_3}{r_{35} \times \cos\varphi_3} \quad (15)$$

$$\varphi_L = \arctan\left[ \frac{1}{\sin(\Delta\varphi_5)} \times \left( \cos(\Delta\varphi_5) - \frac{\tau'_{mav}}{\tau_{mav5}} \right) \right] \quad (16)$$

$$r_{5mL} = \frac{-\tau_{mav5}}{m_L \times \cos\varphi_L} \quad (17)$$

These values are used for updating the dynamical model 17, which includes the mathematical description of the rigid body dynamics of the robot, which is shown in a simplified embodiment in FIG. 3.

Consequently, during programming with a new load the operator should first release the robot with the axle 5 in an angle, thereafter turn the axle 5 and subsequently release the robot again. The question is now how the control system will get to know when the operator releases the load. The most secure method is of course to have a press-button (64 FIG. 7) or similar on the robot, which the operator presses when he is no longer touching the robot and wants a calibration to be initiated. Another possibility is that the operator gives the robot a short push and that external interference moments with short duration and exceeding a certain amplitude are detected as a change-over to or from calibration state. It is of course also possible that the calibration is carried out when external moment interferences have been constant during a certain time.

Consequently, we can now presuppose that $\tau_{distexp}$ from the module 18A accurately gives the value on the interference moment the robot would be exposed to if the operator did not touch it and $\tau_{control}$ from the module 18B (according to formula 4) can now be used for controlling the path generation. How this control is performed is shown in FIG. 4.

Figure 4:
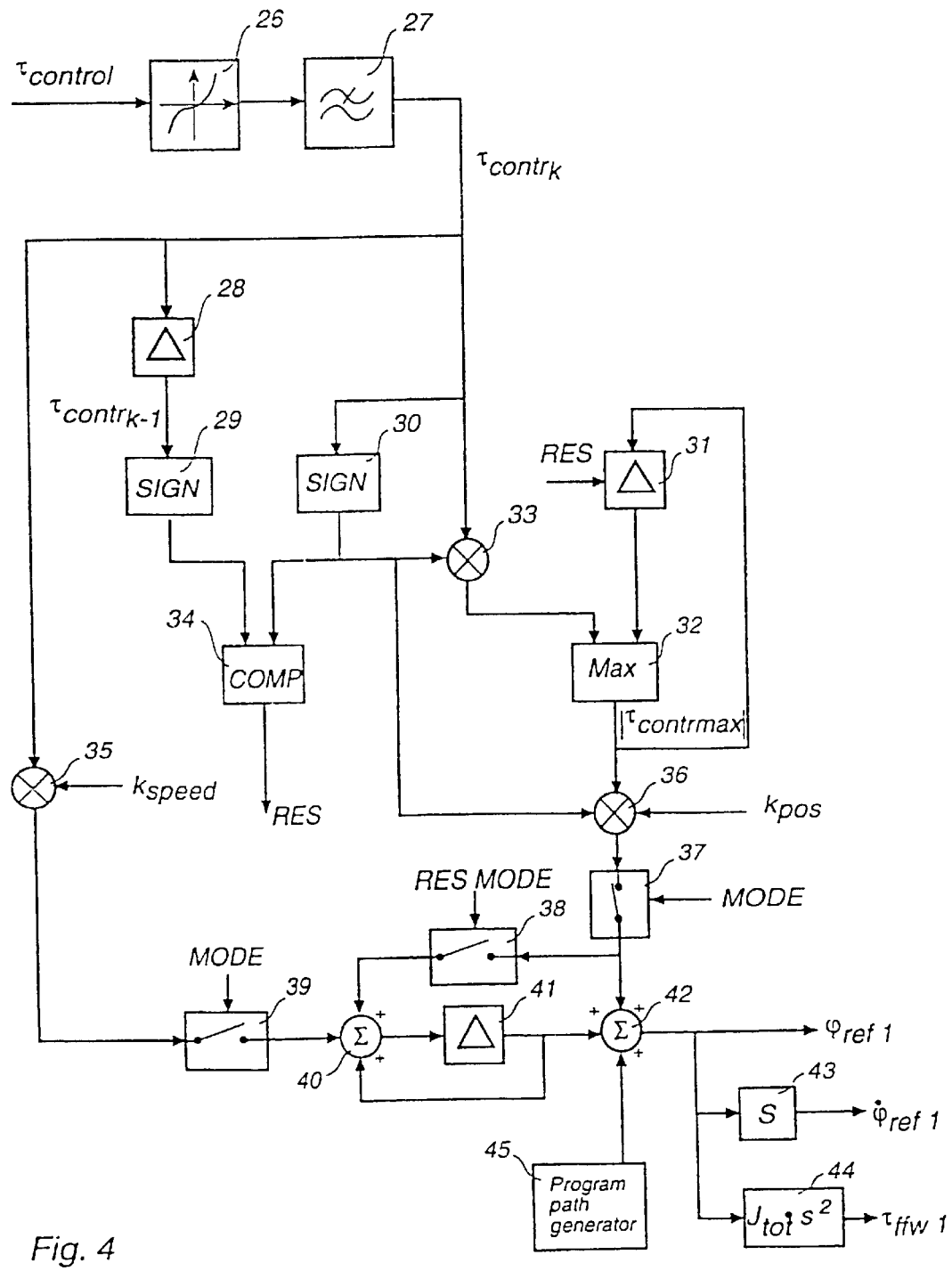
FIG. 4 is a schematic view associated with FIG. 1a and showing further details of the inventional equipment.

According to FIG. 4, a non-linear transfer function 26 is applied to $\tau_{control}$ (according to formula 4), the purpose of which is to suppress small variations in the control-signal. The output signal from 26 passes a low-pass filter 27, the purpose of which is to filter away unwanted signal noise. The output signal from 27 is called $\tau_{contrk}$, where k stands for sample number of the signal. In the buffer 28 $\tau_{contrk}$ is delayed and on its output the previous sample of $\tau_{contr}$ is consequently to be found, i.e. $\tau_{contr(k-1)}$. The circuit 29 determines the sign of $\tau_{contr(k-1)}$ and the circuit 30 the sign of $\tau_{contrk}$. In the comparator 34 it is controlled if 29 and 30 give different signs, in which case a reset (RES) is to be carried out if the operator uses force controlled position manipulation. Which type of manipulation that is being used is determined by the state MODE, and can be changed by the operator. Besides position manipulation, speed manipulation can also be carried out. In this case the switch 37 is open and the switch 39 closed, $\tau_{contrk}$ after multiplication by $k_{speed}$ in the circuit 35 being added to the feedback circuit with the buffer 41 and the summator 40. The position reference $\phi_{ref}$ will then be changed with a speed being proportional to $k_{speed} \cdot T_{contrk}$. If we now revert to the position manipulation mode where the switch 39 is open and the switch 37 is closed, $\tau_{contrk}$ will be multiplied in 33 by its sign, which implies that the output signal from 33 always is positive. The maximum value calculator 32 compares the value of the signal from 33 with the value from the buffer 31 and gives as output signal the maximum value $|\tau_{contrmax}|$, which is applied to the buffer 31 and the multiplying circuit 36. In the latter $|\tau_{contrmax}|$ is multiplied by its sign and thereby obtains the correct sign. Furthermore, a multiplication by $k_{pos}$ takes place, which determines the relation between axle move and $\tau_{control}$. The output signal from 36 passes the mod switch 37 and is in 42 added to the output signal from 41 for obtaining the servo references. If the comparator 34 detects a change of sign of $\tau_{contr}$, the switch 38 is closed for a brief moment so that the latest position manipulation value on the output of 36 can be added to the buffer 41, at the same time as the buffer 31 is reset. The latest position manipulation value is also transferred to the buffer 41 when a change to speed manipulation mode (the signal MODE) takes place. The circuit 43 calculates the speed reference to the regulator by formation of differential quotients and the circuit 44 calculates moment feed forward control by formation of differential quotient two times and multiplication by the mass inertia of the axle.

Figure 5:
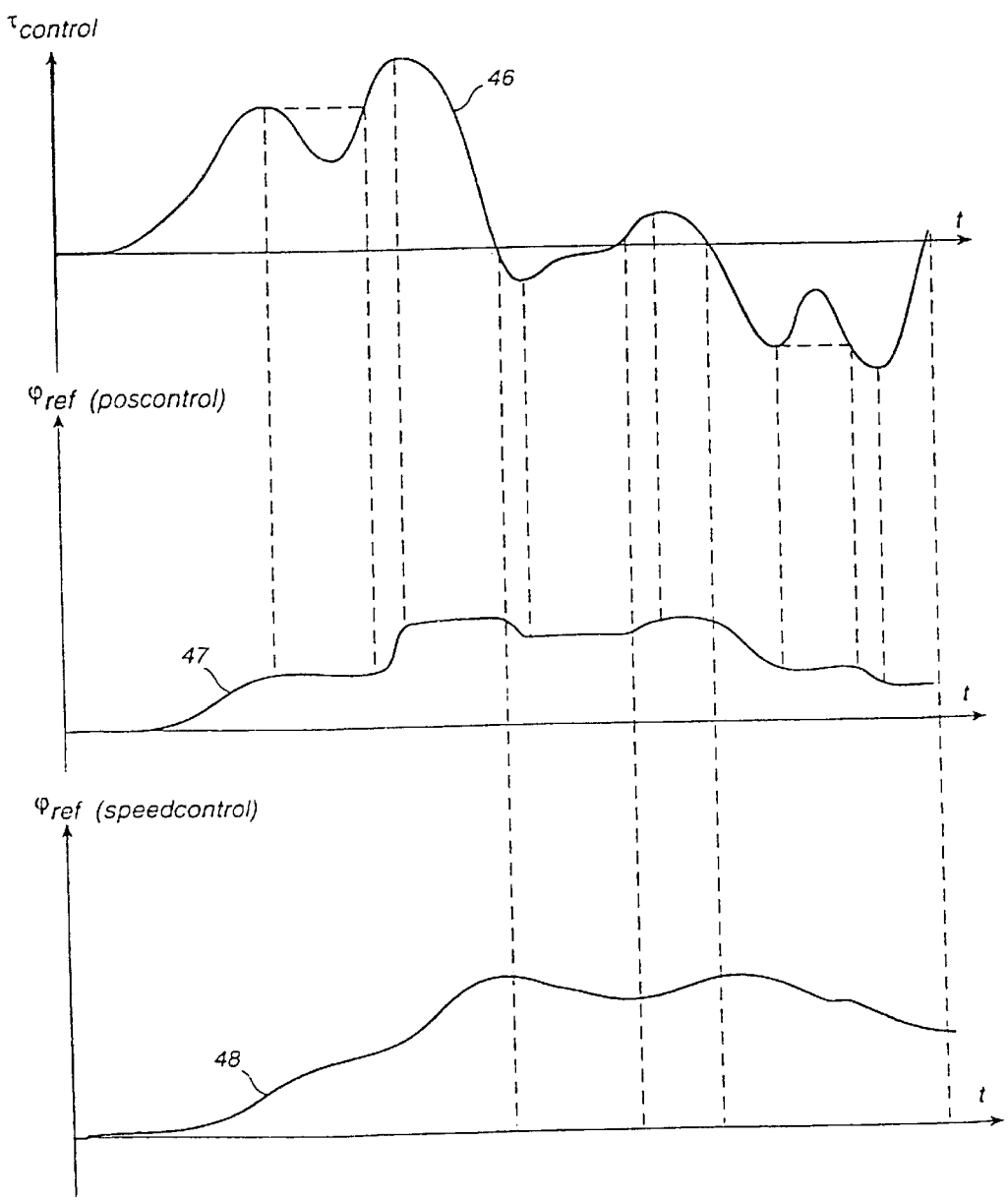
FIG. 5 is a diagram illustrating functionalities of the inventional equipment.

The position and speed manipulation can of course be implemented in several ways, but the important thing is to obtain a functionality according to FIG. 5, where the signal 46 is an example of a period of time of $\tau_{control}$, the signal 47 the resulting position reference in case of position manipulation and the signal 48 the resulting position reference in case of speed manipulation. The position manipulation is especially chosen in case of precision manipulation, whereas speed manipulation is chosen in case of large movements of the robot.

Figure 6:
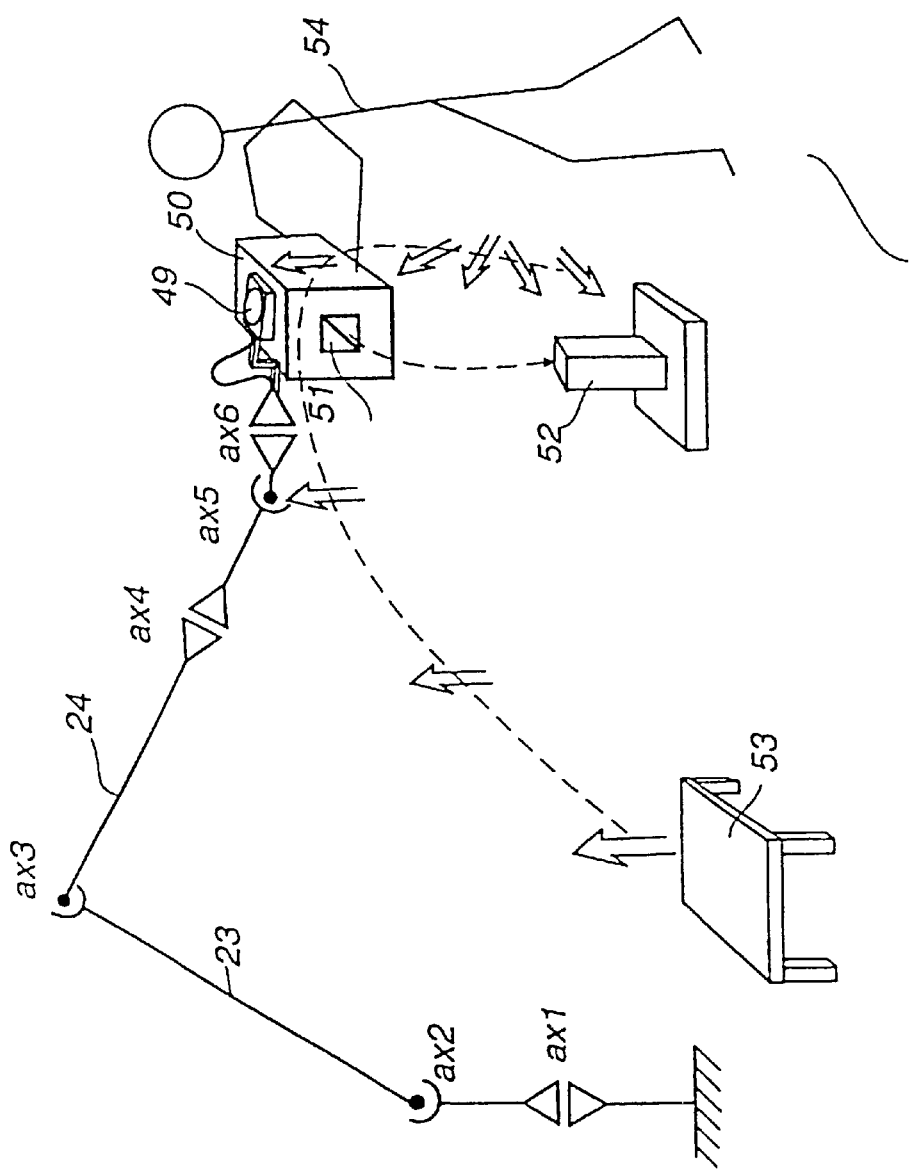
FIG. 6 is a schematic view illustrating the methodology for robot programming and FIG. 7 is a view illustrating a control board with display designed as operator interface.
Figure 7:
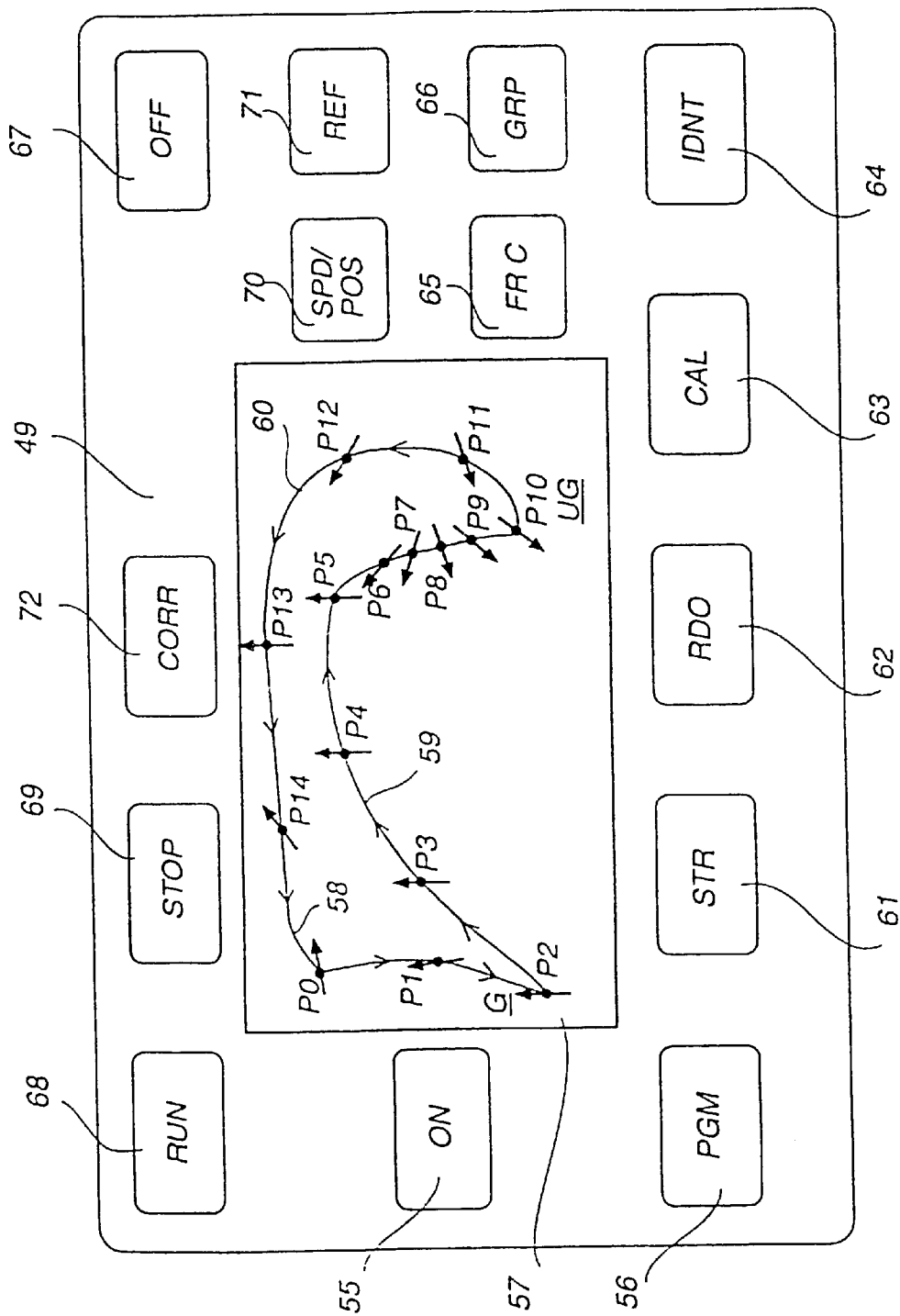

The methodology for the programming when using the described apparatus is exemplified with the aid of FIG. 6 and FIG. 7. Let us assume that the object 50 with the hole 51 initially stands on the stool 53 and then is to be mounted on the beam 52 by moving the object from the stool, turning the object 90° and thereafter bringing the object down over the beam 52 so that the beam enters the hole 51 of the object 50. The operator 54 starts by switching on the robot by pressing the button 55 (FIG. 7) of the programming unit 49. This is placed by the operator e.g. on the gripping appliance, so that the operator during the programming easily can reach the programming unit and follow the movements of the robot on the graphical display 57, which preferably is to show the position and orientation of the object with a three dimensional graphic. The "tool centre point" (TCP) of the gripping appliance is initially in the position PO with the orientation of the tool co-ordinate system indicated by the arrow in PO (FIG. 7). The operator 54 now presses the button 56 (PGM= programming), seizes the gripping appliance and moves TCP to the point P1, at the same time as he/she turns the gripping appliance. In the point P1, he/she presses the button 61 (STR=store) and the position of the robot is stored in the storage of the control system, and P1 with associated point for TCP and arrow for orientation is now shown on the display 57. As the operator moves the robot, the path 58 for the movement of TCP is shown. After the operator has pressed on 61 in the position P1, he/she moves the robot to the position P2 and then positions the gripping appliance so that it can grip the object 50. Thereupon he presses on 61 and subsequently on 66 (GRP=grip), which results in that the gripping appliance grips the object. The operator now seizes the object and lifts it from the stool and presses on 63 (CAL=calculate), which implies that $\tau_{disterr}$ (alt $k_{err}$) is calculated according to formula 8 (alt 10). If the load parameters (mass, centre of gravity) for the object 50 are not known, the operator has to assist the robot in lifting the object in order to overcome the unknown gravitational force of the object, speed control being used in this connection. Before the operator releases the object, he presses the button 70 (SPD=speed POS=position) and passes on to position control, alternatively he presses the button 65 (FRC=force) and disconnects the force controlled interpolator. Thereafter he presses the button 63, whereby $\pi_{disterr}$ according to (8) or $k_{err}$ according to (10) is calculated. He can then press on 64 (IDNT=identification) for the first step in the load identification, in which case the mass of the load is calculated according to e.g. formula 15, press on 70 (alt 65) in order to pass into speed control, turn the load about an axle approximately in parallel with the horizontal plane, press on 70 (alt 65) and then on 64. The system now calculates all the load parameters and updates the dynamical model (compare FIG. 3). Thereupon, the operator presses on 63 and $\tau_{disterr}$ (alt $k_{err}$) is updated since ($\tau_{distmodel}$) now also comprises the moment components from the identified load. The operator now presses on 70 (alt 65) and can with speed control move the object to P3, here press on 61, move the object further on to P4, press on 61, etc. When necessary, the operator can press 63 (if the object is not at rest when the operator releases it). At the position P9, where precision is required in order to get the beam 52 into the hole 51, the operator suitably passes on to position control (button 70) before he/she presses on 61 for storing of P9. After insertion of the position P10, the operator presses on 65, which implies that the moment controlled manipulation is disconnected, and thereafter on 66, the robot now releases the object 50. Since the gripping appliance is in offstate, the dynamical model is updated without load and when the operator subsequently presses on the button 65, he/she can return to the home position P0 in speed control mode while he/she presses on 61 for P11, P12, P13 and P14. By subsequently pressing on 68, he/she can run through the pickup path 58, the object move path 59 and the return path 60. If the operator wants to adjust the path, he/she presses on 69, 56, moves the robot close to the position he/she wants to adjust, presses on 62 (REDO-function), moves the object to desired position and presses on 61. With the button 67, the robot is switched off and its breaks are activated.

The button 71 has a particular function. It is used for programming a reference direction, along which the robot during program execution can use weakness regulation or force control. If e.g. the position of the rod 52 is different in different assembly operations, the programmed program has to be adjusted from time to time in the positions P9 and P10. How large this adjustment is to be can be calculated by reading the robot axle angles when the robot in e.g. two different directions in the horizontal plane presses the object 50 with a defined force against the rod 52.

Another way of adapting the movements of the robot to varying conditions in the surroundings is that an operator assists the robot during the program execution when the robot works in the production. This can be exemplified in FIGS. 6 and 7 by the robot running according to the programmed path to e.g. the position P8. Here the robot stops and the operator steps forward, presses on the button 56, adjusts with his hands the position and orientation of the object 50 until the rod 52 is directly under the hole 51, presses on the button 72, the rest of the programmed positions now being corrected (position, orientation) just as much as the operator has adjusted the object manually. Thereafter the operator presses on the button 68 and the corrected program is executed. In this way, an assistant robot is obtained, which can assist the operator in e.g. heavy lifts, in generating large assembly forces and in performing difficult movements.

The exemplifying embodiment is of course not to be regarded as limiting for the inventional idea. Several modifications consequently occur for men skilled in the art, when the basic inventional solution has been presented. Such modifications are comprised within the scope of the invention, as well as equivalent embodiments. It is particularly pointed out that the invention has been illustrated in the drawing in principal. The illustration technique has in certain aspects been chosen in order to simplify the understanding. As an example it is pointed out that the two devices 18A and 18B are illustrated as separated. In reality they can of course be semi-detached or otherwise integrated.

What is claimed is:

1. An equipment for controlling an industrial robot, which robot has a plurality of rotation and/or translation axles, the equipment comprising:

at least one motor at each of said axles for generating desired movements of the arms and/or the wrist, of which the robot is constituted, least one sensor at each of the axles for measuring axle angle and/or axle position, at least one servo for each of the axles for controlling the motors based on measurement values from the sensors, at least one path generator for generating at least one reference (($\phi_{ref}$, $\phi_{ref}$, $\pi_{ffw}$) for each of the servos, an apparatus at least one of the axles, which apparatus comprises a first device for calculation of the expected interference moment value ($\pi_{distexp}$) of said axle when the movable parts of the robot is not exposed to any external forces by interaction with an operator or other things in the surroundings of the robot, and a second device for comparing this expected interference moment value ($\pi_{distexp}$) with values of the moment reference ($\pi_{mr}$) of the servo and/or with values of the moment ($\pi_m$) of the motor and/or with values of moment measured on the axle with sensors and for forming, based on this comparison, a signal ($\pi_{control}$) for controlling the path generator, wherein a function generator included in said apparatus for supplying to the servo at least one reference signal (($\phi_{ref2}$ and/or ($\phi_{ref2}$ and/or $\pi_{ffw2}$) for generating a to and fro motion of the axle controlled by the servo, and means for calculation of said values of the moment reference ($\pi_m$) of the servo and/or of the moment ($\pi_m$) of the motor and/or the moment of the axle by mean value formation (in the unit 18B according to formula 4B).

2. An equipment according to claim 1, wherein the function generator is arranged to generate a periodic signal and that means (in the unit 18B according to formula 4B) for forming the mean value is arranged to form this mean value over at least one period ($t_i$ to $t_{i+1}$) of this signal.

3. An equipment according to claim 1, wherein the apparatus comprises devices for generating, from the output signal of the function generator, position and speed references ($\phi_{ref2}$, $\phi_{ref2}$) and moment feed forward control reference ($\pi_{ffw2}$) to the servo, the moment feed forward control reference ($\pi_{ffw2}$) being formed by multiplication (in the device 4) of the estimated frictional moment ($\pi_f$) and the sign (from the device 3) of the speed reference ($\phi_{ref}$) or the speed ($\phi_m$) for the axle in question.

4. An equipment according to claim 3, wherein a device is arranged to calculate the estimated frictional moment by identification of the frictional moment either at a particular calibration occasion or during the robot programming by measuring the motor moment reference ($\pi_{mr}$) at least two different points of time, at which points of time the motor axle has different directions of rotation (formula 2), and that a storage buffer is arranged to receive the identified frictional moment values ($\pi_f$) for later use during generation of the moment feed forward control reference ($\pi_{ffw2}$).

5. An equipment according to claim 1, wherein the expected interference moment value ($\pi_{distexp}$) given by the first device consists of the interference moment ($\pi_{distmodel}$) of the robot axle in question calculated in the rigid body dynamical model for the robot, comprising mainly the moment on the axle caused by the gravitation (compare the formulas 11–14).

6. An equipment according to claim 5, wherein means for determining the error ($\pi_{disterr}$, $K_{eer}$) of the interference moment ($\pi_{distmodel}$) of the robot axle in question calculated in the rigid body dynamical model by calibration against the moment reference ($\pi_{mr}$) of the servo and/or against the moment ($\pi_m$) of the motor and/or against the moment (formula 8, 10) measured on the axle, when the movable parts of the robot (including gripping appliance, object and/or tool) are not exposed to any external forces by interaction with the operator or any other things in the surroundings of the robot.

7. An equipment according to claim 6, wherein said apparatus for at least one of said axles comprises a device for calculating the expected interference moment value ($\pi_{distexp}$) as the sum of said model error ($\pi_{disterr}$) and the model calculated interference moment ($\pi_{distmodel}$), see formula 6), said model error ($\pi_{disterr}$) being determined by calibration against one of the moment mean values ($\pi_{mrav}$) when the movable parts of the robot (including gripping appliance, object and/or tool) are not exposed to any external forces by interaction with the operator or any other things in the surroundings of the robot, and that the model error ($\pi_{disterr}$) during the calibration is calculated as the difference between model calculated interference moment ($\pi_{distmodel}$) and prevailing moment mean value ($\pi_{mrav}$, formula 8).

8. An equipment according to claim 6, wherein the apparatus for at least one of the axles comprises a device for calculating said expected mean value ($\pi_{dist-exp}$) as the product of the model error ($K_{err}$) and the model calculated interference moment ($\pi_{distmodel}$, see formula 9), and that the model error ($K_{err}$) is determined by calibration against one of the moment mean values ($\pi_{mrav}$) when the movable parts of the robot (including gripping appliance, object and/or tool) are not exposed to any external forces by interaction with the operator or any other things in the surroundings of the robot, and that the model error ($K_{err}$) during the calibration is calculated as the quotient between prevailing moment mean value ($\pi_{mrav}$) and the model calculated interference moment ($\pi_{distmodel}$, see formula 10).

9. An equipment according to claim 5, wherein the equipment comprises a device for identification of at least the load parameters mass ($m_L$) and position of center of gravity ($X_L$, $Y_L$, $Z_L$) of gripping appliance and/or object and/or tool carried by the robot, and the utilization of the identified load parameters for a more accurate calculation of the model calculated interference moment ($\pi_{distmodel}$, see formula 15–17).

10. An equipment according to claim 1, wherein the first device is arranged to set the expected interference moment value ($\pi_{distexp}$) equal to the value of the moment reference ($\pi_{mr}$) of the servo and/or of the moment ($\pi_{nm}$) of the motor and/or of the moment measured on the axle (formula 5), when the movable parts of the robot are not exposed to any external forces by interaction with the operator or any other things in the surroundings of the robot.

11. An equipment according to claim 10, wherein the second device is arranged to calculate the signal $\pi_{control}$ for controlling the path generator as the difference between expected interference moment ($\pi_{distexp}$) and either of said servo, motor or axle moment ($\pi_{mrav}$, see formula 4A).

12. An equipment according to claim 1, wherein the second device is arranged to calculate said signal ($\pi_{control}$) for controlling the path generator as one minus the quotient between either of said servo, motor or axle moment ($\pi_{mrav}$) and expected interference moment ($\pi_{distexp}$), alternatively as the quotient between expected interference moment ($\pi_{distexp}$) and either of said servo, motor and axle moment ($\pi_{mrav}$) after that the quotient has been reduced by 1 (see formula 4B).

13. An equipment according to claim 1, wherein the path generator is arranged to use said signal ($\pi_{control}$) for controlling the path generator in order to calculate servo references ($\phi_{ref1}$, ($\phi_{ref1}$, $\pi_{ffwd}$) by forming a speed reference component as a function of the size of the control signal ($\pi_{control}$) and/or a position reference component as a function of the size of the control signal ($\pi_{control}$).

14. An equipment according to claim 13, wherein said speed component is calculated by multiplication of said control signal ($\pi_{control}$) by a constant ($k_{speed}$).

15. An equipment according to claim 13, wherein said position reference component is calculated by multiplication (in 36) of a local maximum of said control signal $\pi_{contrmax}$) by a constant ($k_{pos}$).

16. An equipment according to claim 1, wherein said control signal ($\pi_{control}$) passes through a non-linear function and/or a low-pass filter and/or a band-pass filter.

17. A method for programming or for adjusting the movement of a robot by utilization of an equipment according to any of claim 1, wherein the operator manipulates the arms of the robot by interaction with the arms of the robot and/or tool, gripping appliance and/or object carried by the robot, the operator has the use of an operator interface, which by the operator can be attached at a suitable place on the robot, tool, gripping appliance, object or things in the surroundings of the robot, the operator utilizes said operator interface by press-button and/or voice interface in order to give said equipment the orders required for obtaining the desired function of the described apparatus.

18. A method according to claim 17, wherein the operator with said press-button and/or voice interface gives orders for calibration of the expected interference moment ($\pi_{distexp}$, press-button 63).

19. A method according to claim 17, wherein the operator with said interface gives orders for switching between speed and position control (MODE, press-button 70).

20. A method according to claim 17, wherein the operator with said interface gives orders for identification of the load carried by the robot (press-button 64).

21. A method according to claim 17, wherein the operator gives orders for connecting up of or disconnection of moment control $\pi_{control}$) of the path generator (press-button 65).

22. A method according claim 17, wherein the operator gives orders for marking a programmed position as auxiliary position for calculating the direction during force control (press-button 71).

* * * * *